Patented Aug. 18, 1931

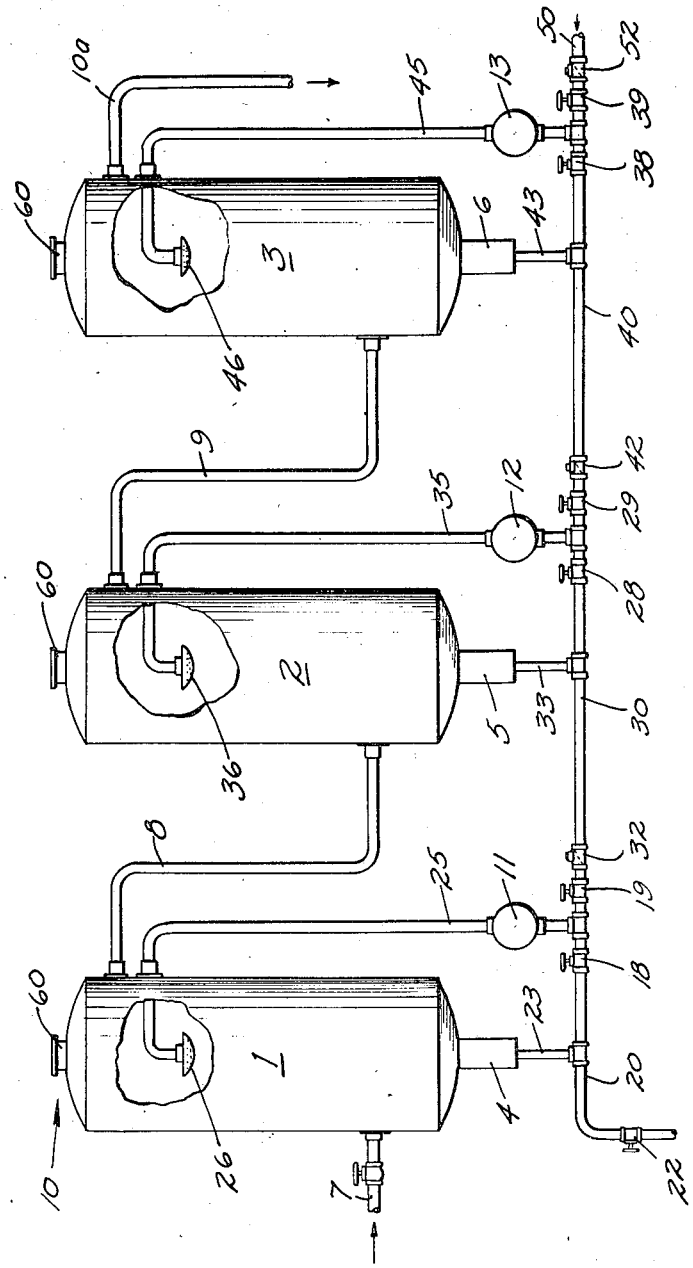

1,819,348

UNITED STATES PATENT OFFICE

GERHARDUS H. van SENDEN, OF MARTINEZ, CALIFORNIA, ASSIGNOR, BY MESNE ASSIGNMENTS, TO SHELL DEVELOPMENT COMPANY, OF SAN FRANCISCO, CALIFORNIA, A CORPORATION OF DELAWARE

PROCESS OF TREATING LIQUID HYDROCARBONS

Application filed March 27, 1928. Serial No. 265,120.

My invention relates to the chemical treatment of hydrocarbons.

Hydrocarbon products obtained by the destructive distillation of petroleum, usually referred to as "pressure distillates", consist chiefly of products of decomposition. A large portion of these is stable and in every way desirable, but the difficulty of separating a comparatively small proportion of these which are deleterious constitutes one of the most difficult problems of refining pressure distillates.

This separation is usually accomplished by treatment of the distillates with sulphuric acid which combines with the undesirable products of decomposition in the distillate to form heavy pitch-like bodies called "acid sludge". However, where acid of full strength is applied to the untreated distillate, the acid combines not only with the undesirable compounds but also with a considerable amount of the desirable products of decomposition.

Several methods for applying the acid so as to prevent this have been devised. One of these involves dilution of the acid in the first treatment of the distillate but this is exceedingly wasteful of acid and is therefore little used. Another method is to treat the distillate in a series of steps, in the last of which fresh acid of full strength is used but in each of the preliminary steps of which the distillate is treated with acid sludge formed in the next subsequent treating step. In other words, a counter flow of acid sludge is set up from the last step to the next to the last and from the next to last step to the one before that and so on until the weakest sludge comes first into contact with the fresh distillate.

The counter flow acid treatment as previously practiced usually involved treatment of the distillate in three steps so that the sludge drawn off from the first treating step had practically no free acid left in it. This, however, only meant that complete combination of the acid was effected in the treatment and my investigations show that considerable quantities of desirable compounds were combined with the acid and removed from the distillate, which represented a pure loss both of these compounds and of the acid consumed in combining with them. No way of preventing this was known however as the amount of acid required to be used in the final step was determined by the needs of removing certain compounds present in the distillate arriving at this step of the process, so that the product would meet the commercial requirements.

It is therefore an object of my invention to provide a method of treating distillates to remove undesirable products of decomposition therefrom in which method the quantity of desirable compounds removed from the distillate will be reduced materially below the amount of these removed in similar processes previously practiced.

It is another object of my invention to provide a method of treating distillates to remove undesirable products of decomposition therefrom in which method the character of the final product may be controlled.

A further object of my invention is to provide such a method in which the consumption of acid will be materially reduced over the amount consumed by previously known similar processes.

Further objects and advantages will be made apparent in the following description of the accompanying drawing in which an apparatus suitable for carrying out the method of my invention is diagrammatically illustrated.

Referring specifically to the drawing, an apparatus 10 is shown which includes treating tanks 1, 2, and 3. These treating tanks are provided respectively with sludge settling sumps 4, 5, and 6. Connecting with the tank 1 at a point a slight distance above the lower end thereof, is a pressure distillate inlet pipe 7. Connecting the upper end of the tank 1 with the tank 2, at a point on the same level as pipe 7, is a pressure distillate transfer pipe 8. Connecting the upper end of the tank 2 with the lower portion of the tank 3, at a point on the same level with the pipe 7, is a distillate transfer pipe 9. Leading from the upper end of the tank 3 is a pressure distillate outlet pipe 10a.

The tanks 1, 2, and 3 are respectively provided with sludge circulation pumps 11, 12, and 13. The suction end of the circulating pump 11 is connected through suitable fittings to valves 18 and 19, the valve 18 being connected to one end of a pipe 20 provided at its opposite end with a valve 22 and having a branch 23 which connects to the sludge sump 4 of the tank 1. The discharge end of the circulation pump 11 connects through a pipe 25 with a spray nozzle 26 disposed in the upper end of the tank 1 some distance below the point at which the distillate transfer pipe 8 leads therefrom.

The suction end of the circulation pump 12 connects through suitable fittings to valves 28 and 29, the valve 28 being connected to one end of a pipe 30, provided at its opposite end with a check valve 32 which is connected to the valve 19. The pipe 30 has a branch 33 which connects to the sludge sump 5 on the tank 2. The exhaust end of the circulating pump 12 is connected through a pipe 35 to a spray nozzle 36 disposed in an upper portion of the tank 2 some distance below the point at which the transfer pipe 9 leads from this tank.

The suction end of the circulating pump 13 is connected by suitable fittings to valves 38 and 39, the valve 38 being connected to one end of a pipe 40, which is provided at its opposite end with a check valve 42, which is connected to the valve 29. The pipe 40 has a branch 43 which connects with the sludge sump of the tank 3. The discharge end of the circulating pump 13 is connected by a pipe 45 to a spray nozzle 46 provided in an upper portion of tank 3 some distance below the point at which the distillate outlet pipe 10a leads therefrom. Connecting with the valve 39 is an acid inlet pipe 50 which is provided with a check valve 52.

I will now describe the operation of the apparatus 10 in performing the process of my invention.

Pressure distillate is introduced into tank 1 through pipe 7, until tanks 1, 2, and 3 are filled and the pressure distillate is being discharged from tank 3 through pipe 10a. A certain amount of acid sludge formed by reaction between concentrated sulphuric acid and pressure distillate, of a gravity approximately between 55–60° Bé. is now introduced through pipe 50, the valves 38 and 29 being closed. By operation of circulating pump 13 this sludge is mixed with the pressure distillate in tank 3; when a sufficient amount of sludge has been taken in, the supply of further sludge through pipe 50 is shut off by closing valve 39, valve 38 is opened, and pump 13 will circulate the sludge, drawing it off from the sump 6, and spraying it in the top of the same tank. When this sludge has been thoroughly mixed with the oil, pipe 50 is connected with a supply of fresh sulphuric acid, valve 39 is partly opened, and also valve 29, and pump 12 put in operation. Pump 13 now will draw a certain amount of fresh acid which is mixed with the sludge in tank 3; the supply of fresh acid will thereafter be regulated so as to keep the sludge in tank 3, at the exact strength required for the product treated, so that a product up to commercial standards is delivered through pipe 10a. Part of the sludge settling in sump 6 is drawn by pump 12 through pipe 40, and valves 42 and 29, and mixed with the oil in tank 2, through pipe 35 and spray 36, valves 28 and 19 being closed. When sufficient sludge has accumulated in tank 2, it is further circulated by opening valve 28, until properly mixed. Then valve 19 is partly opened, and in the same way as tank 2, tank 1 is put in operation. Thereafter the spent sludge will be regularly drawn off through valve 22, while fresh acid is admitted through pipe 50.

From this description it will be clear that in operation the strength and amount of sludge used in each of the three treaters can be exactly regulated and suited to the pressure distillate treated, which differs constantly because of the difference in the crude used, and the conditions of the cracking. Preferably I maintain the sludge in tank 3 at around 60–55° Bé. gravity, in tank 2 approximately 55–50° Bé. and in tank 1 between 40–35° Bé., but not over 40° Bé., for reasons which I will explain hereafter. The difference in the gravity of the sludge is caused by the difference in the amount of free acid contained, the fresh acid being heavier than the reaction products of acid and oil, which constitute the sludge, the sludge on its counterflow through the three tanks, will gradually become lighter; the gravity of the sludge is a direct indication of the amount of free acid left, and consequently of the strength of the reaction it will have on the pressure distillate.

It is, of course, to be understood that the product discharged through the pipe 10a must meet certain commercial requirements and that the acidity of the sludge circulated through tank 3 must be sufficiently high to remove enough of the undesirable products of decomposition in the distillate so that the distillate discharged through the pipe 10a will fully meet these commercial requirements as to content of decomposition products. The acidity of the sludge circulated through tank 3 is therefore regulated entirely with respect to the analyses made of the pressure distillate discharged from the pipe 10a. The acidity of this sludge is determined by the amount of acid drawn in by the pump 13 through the valve 39 from the pipe 50. The gravity of the acid thus introduced usually varies from 63–68° Bé., or, in other words, from slightly diluted to slightly fuming acid. Owing to the necessity for the acidity of the sludge circulating in tank 3 being determined by the analyses of the pressure distillate discharged through pipe 10a, the quantity and the acidity of the sludge drawn through the valve 29 by the circulating pump 12 will have as one of their determining factors the quantitative character of the reaction required in tank 3.

As in the case of the third step of the process, carried out in tank 3, the sludge introduced into tank 2 may be circulated through this tank several times, it merely being necessary that a small quantity of this sludge be drawn off, from time to time or continuously, so as to permit an addition to the amount of circulated sludge of a slight increment of the sludge of higher acidity from tank 3. This circulation of sludge in tank 2 is effected by partly closing the valve 19 and slightly opening the valve 28.

Also, in the same manner as carried out in tanks 2 and 3, the sludge in tank 1 is circulated by partly closing the valve 22 and partly opening the valve 18 so that the main body of the sludge in tank 1 is constantly circulated, this body being added to by the sludge drawn from tank 2 through the valve 19 by the pump 11 and decreased by a flow of substantially inactive sludge through the valve 22, from which valve this sludge is led to a suitable place of discharge.

It is desired to point out here that in previous processes of the same general character as the process of my invention, the obtaining of an acid sludge of less than 30° Bé., which sludge is practically inactive, and the obtaining of distillate as the final product of the process, which was refined to a degree to meet commercial requirements, were the only two results looked for. In my experiments I have found that a treatment of the raw pressure distillate, containing as it does varying amounts of products of decomposition which are extremely unstable, with an acid sludge containing more than a limited amount of free acid, results in side reactions in which sulfonated side products are formed which are soluble in the pressure distillate and which in later treatment will cause corrosion, discoloring and other difficulties. I have found that in order to avoid these side reactions and the loss of desirable olefines, the sludge introduced into tank 1 must never be over 40° Bé. and preferably not over 35° Bé.

In the counter flow acid contact method of treating pressure distillate as previously performed, no attention was given to keeping the strength of the acid sludge in its first contact with the raw pressure distillate low enough so as to prevent these side reactions. In fact it appears that the necessity for such regulation has not previously been known. Having observed the desirability of treating the raw pressure distillate with a sludge of definitely limited acidity, the steps of my process which accomplish this will now be described.

As previously stated, the sludge is circulated in each of the tanks 1, 2, and 3 as a single contact of the sludge with the distillate does not reduce the acidity of the sludge sufficiently to permit it to be entirely passed on to the next previous step of treatment. Moreover, as noted before, the quantity and the acidity of the sludge circulated in tank 3 are regulated with a view to effecting such a reaction in tank 3 that the distillate leaving by pipe 10a has the desired commercial requirements.

The aggregate acid content of the sludge drawn off from tank 3 and sprayed into tank 2 may vary somewhat owing to the fact that within certain limits the quantity and acidity of the sludge circulated in tank 3 may be inversely varied and yet have substantially the same effect upon the distillate passing therethrough. In the process of my invention the sludge in tank 3 is regulated so that the aggregate acid content of the sludge entering tank 2 is comparatively low. Even with this relatively low acidity in the sludge entering tank 2, however, the passing of the sludge through tank 2 in the usual manner without circulation would result in the acidity of the sludge delivered from tank 2 to tank 1 being above the acidity of sludge with which the raw pressure distillate may be first contacted without producing the undesirable side reactions mentioned heretofore.

In the process of my invention I therefore control this acidity of the sludge delivered from tank 2 to tank 1. This I do by varying the speed of circulation of the sludge in tanks 2 and 3, which increases or decreases the reaction between the products of decomposition and the acid in these tanks. Where this reaction is increased, a larger amount of acid is converted into sludge and where it is decreased, a larger amount of acid passes with the sludge as free acid into tank 1.

Suitable means of testing the acidity of the acid sludge and the content of the pressure distillate at various points in the apparatus are provided, these testing means being omitted from the drawing.

The reaction in tank 2 is thus controlled so that the gravity of the sludge passing from tank 2 to tank 1 is maintained at substantially 35° Bé. and it is preferable that it should not go above 40° Bé. at any time.

When I first discovered the process of my invention, it seemed possible that the control of the acidity of the sludge introduced into tank 1 would result in an excessive reaction being required between the acid and the products of decomposition in tank 2 which might accomplish a uniting of the acid with a large quantity of desirable olefines, which otherwise would remain in the distillate when discharged from the last step of the process. This apparently does not occur, however, and it appears that where it is necessary to speed up the reaction in tank 2, in order to lower the acidity of the sludge delivered to tank 1, that what happens in tank 2 is merely a more rapid union of the acid with the undesirable decomposition products in the distillate.

The lowered acid content of the sludge delivered to tank 1 apparently causes the removal in this tank of only the more unstable of the undesirable products of decomposition in the distillate so that a much faster reaction in the second step is possible with only a very small loss of desirable compounds from the distillate. As noted above, the elimination of side reactions in the first step of the process also prevents the formation in the first step of sulfonated compounds soluble in the distillate which would cause discoloring in the final product obtained, and impart thereto corrosive qualities. The circulation of the sludge several times through the same tank results in the advantage that much less fresh acid is needed to be introduced in tank 3.

Another important benefit resulting from the use of my process is a much smaller loss of distillate, in the production of a refined distillate having given commercial characteristics, than the losses formerly thought necessary.

While but a single apparatus is illustrated for carrying out the method of my invention, it is to be understood that any apparatus suitable for this purpose may be used, and that the scope of the invention, an illustrative example only of which is set forth above, is to be ascertained from the terms of the appended claims.

I claim as my invention:

1. The process of treating petroleum distillate containing decomposition products, which comprises: treating the said distillate in three steps; in the first, by countercurrent contacting with sulfuric acid sludge produced by the second step, said sludge being of not over 40° Bé.; the second, by countercurrent agitation of oil refined by the first step with a sludge produced by the third step, said sludge being of not less than 55° Bé.; the third step being the countercurrent treatment of the oil previously refined by the first and second steps with fresh sulfuric acid of from 63° to 68° Bé. and so limited in amount as to produce a sludge of gravity not heavier than 60° Bé.

2. A process according to claim 1 in which the extent and rate of the reaction between the oil and the acid substances is regulated by varying the speed at which the oil and acid substances make their countercurrent contacts.

3. The process of treating petroleum distillates containing decomposition products resulting from cracking which comprises acting upon the said distillate with sulfuric acid in three steps: in the first by contacting intimately with a sulfuric acid sludge produced in the second step, said sludge being of a strength insufficient to produce additional color in the petroleum distillates but sufficient to remove a substantial proportion of the colored products present; in the second step intimately contacting the distillates refined by the first step with a sulfuric acid sludge produced by the third step, said sludge being of not less than 55° Bé.; and the third step being the intimate contacting of the oil previously refined by the first and second steps with fresh sulfuric acid limited in amount so as to produce a sludge of a gravity between the approximate limits of 55° Bé. and 60° Bé.

In testimony whereof, I have hereunto set my hand at Martinez, California, this 17 day of March, 1928.

GERHARDUS H. van SENDEN.